United States Patent
Mahoney

(10) Patent No.: US 6,206,268 B1
(45) Date of Patent: Mar. 27, 2001

(54) FRICTION STIR WELDING PIN WITH INTERNAL FLOW CHANNELS

(76) Inventor: Murray W. Mahoney, 1584 N. Calle Le Cumbre, Camarillo, CA (US) 93010

( * ) Notice: Subject to any disclaimer, the term of this patent is extended or adjusted under 35 U.S.C. 154(b) by 0 days.

(21) Appl. No.: 09/615,027

(22) Filed: Jul. 13, 2000

(51) Int. Cl.[7] .................................................. B23K 20/12
(52) U.S. Cl. ........................................ 228/112.1; 228/2.1
(58) Field of Search .................................. 228/112.1, 2.1, 228/5.5, 106, 25; 156/73.5; 1/580

(56) References Cited

U.S. PATENT DOCUMENTS

| | | |
|---|---|---|
| 4,811,887 | 3/1989 | King et al. . |
| 5,460,317 | 10/1995 | Thomas et al. . |
| 5,611,479 | 3/1997 | Rosen . |
| 5,682,677 | 11/1997 | Mahoney . |
| 5,713,507 | 2/1998 | Holt et al. . |
| 5,718,366 * | 2/1998 | Colligan . |
| 5,813,592 | 9/1998 | Midling et al. . |
| 5,893,507 | 4/2000 | Ding et al. . |
| 6,029,879 * | 2/2000 | Cocks . |
| 6,045,027 | 4/2000 | Rosen et al. . |
| 6,053,391 * | 4/2000 | Heidman et al. . |

FOREIGN PATENT DOCUMENTS

2306366 * 7/1997 (GB) .

* cited by examiner

*Primary Examiner*—Patrick Ryan
*Assistant Examiner*—Colleen P. Cooke
(74) *Attorney, Agent, or Firm*—Stout, Uxa, Buyan & Mullins, LLP; Donald E. Stout

(57) ABSTRACT

A friction stir welding pin having internal flow cavities. The pin is adapted to be driven by a conventional friction stir welding machine, and may include external threads for forcing plasticized material toward the weld root. An internal cavity located along the centerline and open to the distal end facilitates deformation of the workpiece material at the weld root. One or more flow channels extending from the sidewall of the pin to the internal flow cavity induce a continuous path of plasticized metal through the pin. The internal cavity may include internal threads to further help force plasticized material toward the root weld. The pin is particularly useful in welding aluminum work pieces where the tolerance of the workpiece thickness is not critical.

20 Claims, 2 Drawing Sheets

FRICTION STIR WELDING PIN WITH INTERNAL FLOW CHANNELS

FIELD OF THE INVENTION

The present invention relates to friction stir welding and, in particular, to an apparatus and method for friction stir welding two pieces together with a reduced incidence of weld root defect.

BACKGROUND OF THE INVENTION

Friction welding is based on the principal of "rubbing" together two articles to be joined so as to generate a sufficient amount of heat and plasticize the adjacent surfaces. The frictional heat is generated solely by the adjacent work pieces to be joined.

A more robust version of friction "stir" welding utilizing a rotating, non-consumable probe or pin has been developed. The pin is of a harder material than the work pieces to be joined, and relative cyclic movement of the pin generates the frictional forces to plasticize the workpiece material. Because of this movement of the non-consumable pin, the method has been named friction stir welding; with the pin "stirring" the material. Aluminum is a particularly suitable soft material that can be readily friction stir welded. The aerospace industry is aggressively pursuing friction stir welding of aluminum panels for the outer skins of launch vehicles because of the weld quality and repeatability.

In a conventional butt joint, for example, the pin spins or linearly reciprocates and travels along the interface between the adjacent or "faying" work piece surfaces to create the plasticize weld joint. Typically, the two work pieces are placed on a backing surface and are tightly held together to prevent separation during the friction stir welding process. Further, a stationary shoulder surrounding the moving pin applies forging pressure to the area around the faying surfaces on the opposite side from the backing surface to prevent the plasticized material from extruding out of the joint. The result is a relatively smooth and void-free joint.

The reciprocating probe or pin is preferably configured to force the plasticize material downward and backward in its "wake." When the pin translates between the faying surfaces, plasticized material flows from the front of the pin to the rear. The pin extends almost to the bottom of the material to be joined, but cannot extend all the way through so as to avoid contact with the backing surface, which might pull support tooling debris into the weld. Ideally, the rotating pin is held a fixed distance from the backing surface, typically about 0.254 mm (0.010 inch), and the "throwing power" of the rotating pin is relied on to fill the remaining gap. "Throwing power," in this sense, is defined as the extent of deformation achieved beyond the actual dimension of the pin itself. Of course, there is a limit to the throwing power of any particular stir welding pin, and thus the spacing from the backing surface should be minimized. Unfortunately, variations in material thickness or deflection of the stir welding head can displace the pin a greater distance from the backing surface than intended, potentially resulting in lack of root notch penetration and reduced integrity compared to the remaining weld.

In most cases, the distal face of a rotating pin is convex with a constant radius, and thus the minimum spacing from the backing surface is located almost on the centerline. Because of this configuration, the centerline, being located along the axis of rotation, generates very little or no friction or "stirring" action. The throwing power of the pin results from the stirring action of the radially outer edge of the pin, which action must also induce deformation along the centerline. Depending on the tolerances of the weld process, there is a risk that the throwing power of the rotating pin will not span the entire distance to the backing surface along the centerline of the pin.

U.S. Pat. No. 5,611,479 discloses a friction stir welding technique to ensure complete penetration of the weld. In the '479 patent, the shape of the faying surfaces are modified to create a gap into which the plasticized material will flow for the purpose of reducing root weld defects. Specifically, a chamfer is formed along the faying surfaces of the work pieces running along the weld line and facing the backing surface. Unfortunately, the formation of the chamfers on the work pieces adds a time-consuming and costly step in the weld process.

Consequently, there is a need for a friction stir welding technique that improves the throwing power of the tool or otherwise reduces the possibility of lack of weld root notch penetration.

SUMMARY OF THE INVENTION

The present invention provides a friction stir welding pin having improved throwing power, comprising a pin body rotatable about an axis, the pin having a distal end and an internal flow cavity open to the distal end. The pin may include external threads oriented so as to force plasticized material created during use of the pin toward the distal end. Preferably, the pin also includes internal threads partly defining the flow cavity, the threads oriented so as to force plasticized material created during use of the pin toward the distal end. The pin may further include one or more flow channels extending from an external surface of the pin body to the internal flow cavity. The flow channel(s) are desirably angled toward the distal end from the external surface to the internal flow cavity.

In another aspect, the present invention provides a method of friction stir welding that increases weld root penetration. The method includes providing a friction stir welding pin rotatable about an axis and having a distal end and an internal flow cavity open to the distal end. The pin is rotated at the interface between two work pieces at a speed to plasticize the material of the work pieces. The plasticized workpiece material is then caused to flow through the internal flow cavity toward the distal end. The pin may include a flow channel extending from an external surface thereof to the internal cavity, so that the method includes causing plasticized material to flow through the flow channel to the internal flow cavity. Internal threads partly defining the internal flow cavity may be provided and oriented so as to force plasticized material flowing through the flow channel toward the distal end of the pin.

In a still further aspect, the present invention provides a method of friction stir welding including providing a friction stir welding pin having an internal flow cavity, and operating the friction stir welding pin such that material plasticized by the pin flows through the internal flow cavity. Preferably, the internal flow cavity is located along the centerline of the pin and open to a distal end thereof, wherein the plasticized material flows axially through the internal flow cavity toward the root of the weld. The internal flow cavity may be partly defined by internal threads adapted to force plasticized material toward the distal end of the pin. The internal flow cavity preferably comprises a dead-end cavity open to a distal end of the pin, wherein the pin further includes at least one flow channel extending from a sidewall of the pin to the internal cavity. The method then may involve inducing a continuous flow of plasticized material from the outside of the pin through the flow channel(s) in the sidewall and through the internal cavity to be expelled out of the distal end A further understanding of the nature advantages of the invention will become apparent by reference to the remaining portions of the specification and drawings.

DESCRIPTION OF THE PREFERRED EMBODIMENTS

The present invention is directed to an improved friction stir welding pin having an internal flow cavity and improved throwing power. As mentioned above, throwing power refers to the extent of workpiece material deformation beyond the length of the pin itself. Throwing power can be quantified in terms of absolute distances, or in terms of a ratio of the throwing power distance of a pin of the present invention to the throwing power distance of a pin having the same shape but without an internal flow cavity as described below. In absolute terms, the present invention increases deformation beyond the pin obtained by conventional tools. Weld trials have been performed that illustrate the improved "throwing power" of the internal cavity tool design, wherein deformation beyond the pin distal end increased by about 0.406 mm (0.016 inches). More generally, it was shown in one weld trial that the throwing distance of the tool of the present invention was about 1.5 that of a conventional tool of the same configuration without the internal flow cavity. The throwing distance depends on a number of factors, including several tool dimensions, and may not be linear for larger tools. The particular weld trial was done with a tool having dimensions of approximately 0.3 inch in diameter and 0.25 inch length.

Figure 1:
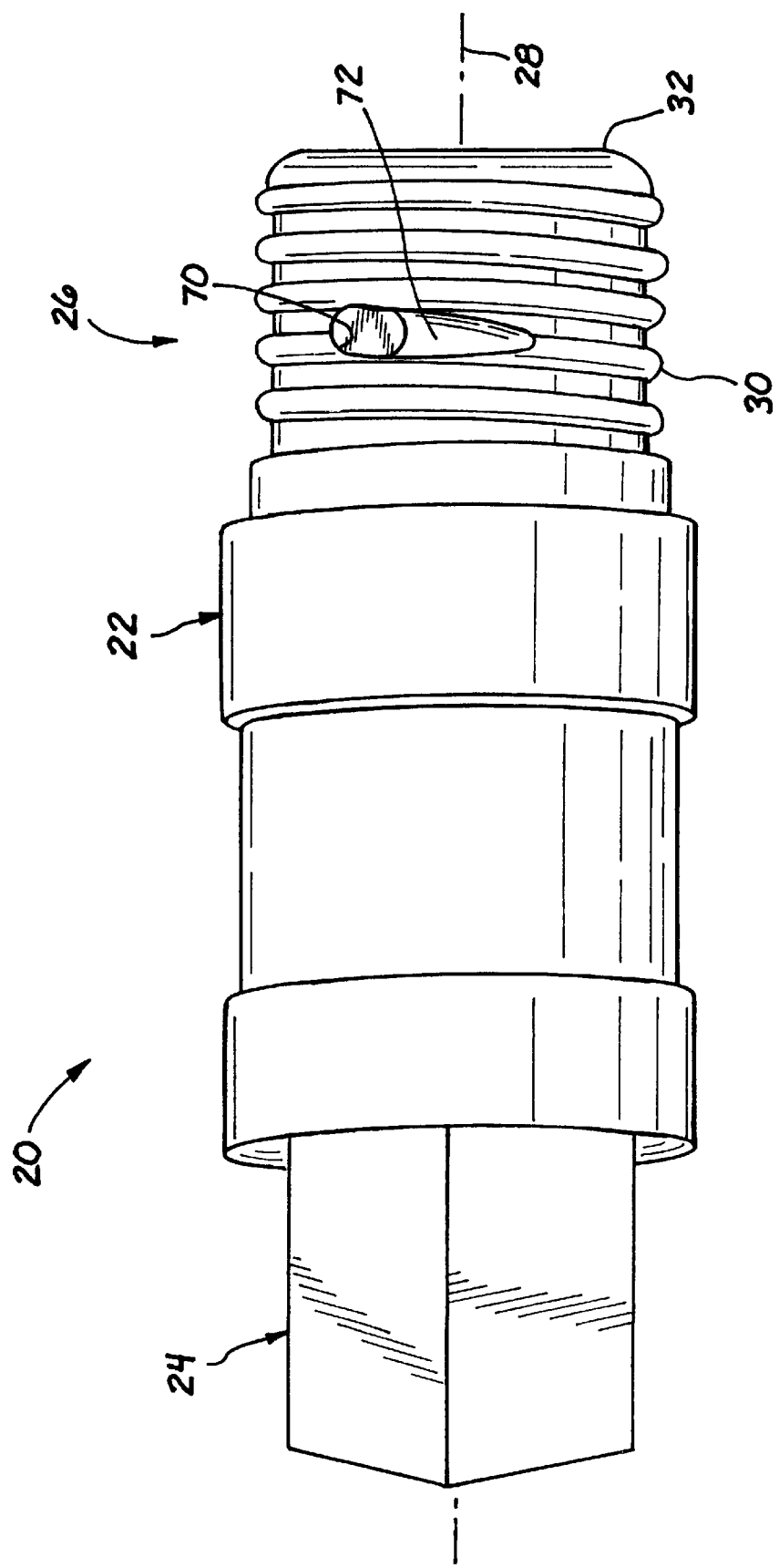
FIG. 1 is an elevational view of a friction stir welding pin of the present invention.

FIG. 1 illustrates an exemplary friction stir welding tool 20 of the present invention having a central body 22, a drive shank 24 extending from one side of the body, and a stir welding probe or pin 26 extending from the other side of the body. The tool 20 is generally cylindrical about an axis 28. The drive shank 24 has a non-circular cross-section, such as a square shape, so as to be rotated about the axis 28 by a similarly-shaped chuck (not shown). Except for the internal flow cavity and channels described below, the friction stir welding tool 20 is preferably solid and of conventional construction. That is, the tool 20 may be formed of a conventional material, such as H13 tool steel, and is adapted to operate in conventional friction stir welding drivers. Indeed, the ability to use the tool 20 in conventional drivers without having to modify the work pieces while obtaining improved throwing power is a significant advantage.

The pin 26 includes a plurality of left-handed threads 30 extending substantially from the central body 22 to a distal end 32. When rotated, the threads 30 help to force material downward (to the right in the figure) into the weld joint, and toward the backing surface. Indeed in conventional tools, the external threads on the pin are the primary cause of material deformation beyond the end of the pin (i.e., throwing power). Although the distal end 32 is illustrated as being convex, it may also be flat, or perpendicular to the axis.

Figure 2:
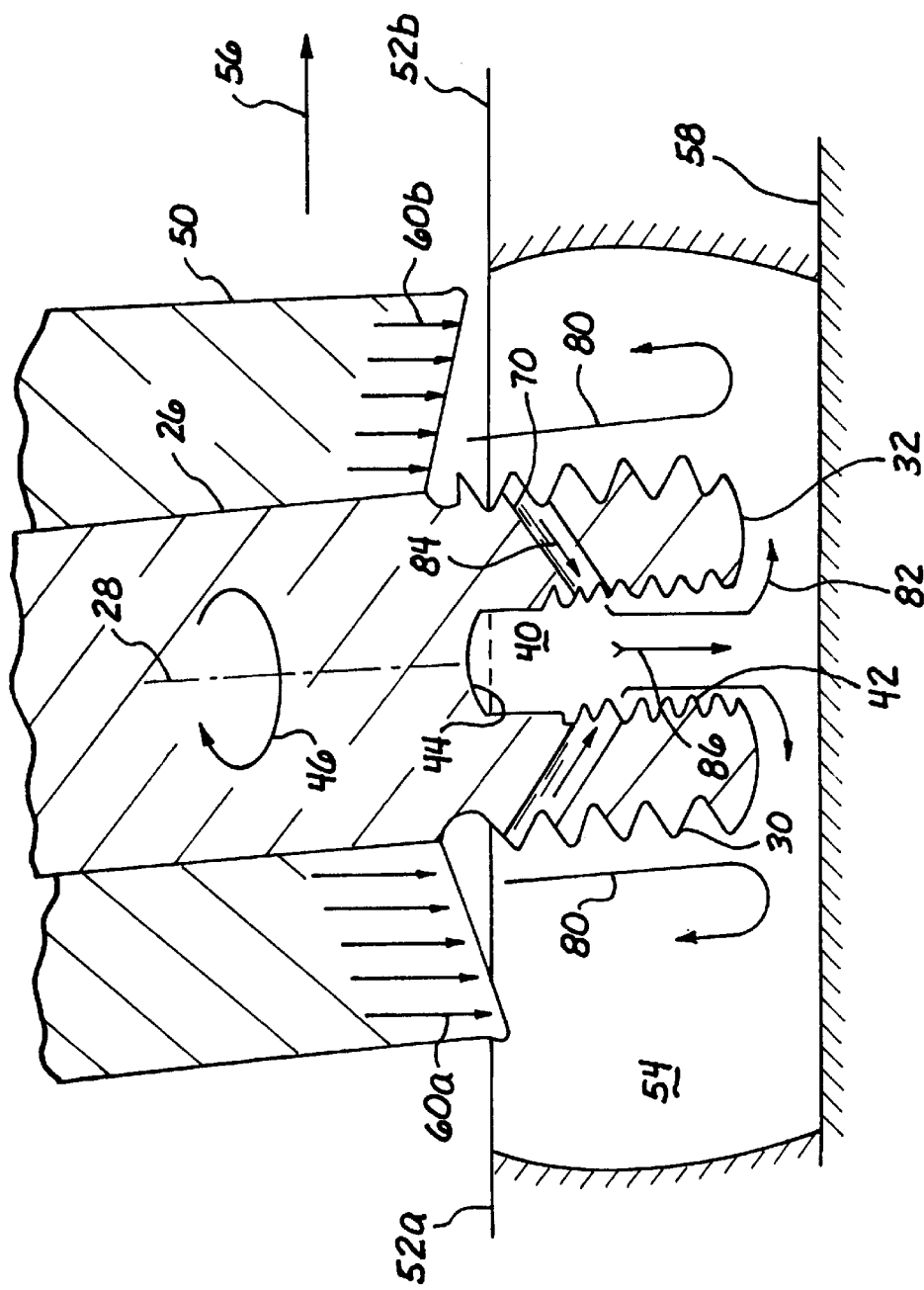
FIG. 2 is a schematic sectional view of the friction stir welding pin of the present invention in use.

With reference now to FIGS. 1 and 2, an internal cavity 40 is shown opening to the distal end 32 of the pin 26. The internal cavity 40 is centered on the axis 28, and is defined primarily by a series of internal threads 42 on the pin 26, as well as a dead-end wall 44. As mentioned above, the external threads 30 are left-handed and force plasticized material toward the distal end 32 of the pin 26. Likewise, the internal threads 42 are right-handed to force material in the same direction.

With reference to the schematic operational view of FIG. 2, the pin 26 is shown mounted for rotation (as seen by arrow 46) within a surrounding forging shoulder 50. The sectional view is taken along the interface between two faying surfaces, and indicates cold workpiece material behind 52a and in front of 52b an area of plasticized material 54; the forward direction of tool travel being indicated at 56. The workpieces are shown supported on a backing surface 58. The arrows 60a, 60b represent the downward forging force supplied by the forging shoulder 50. Because of the slight backward tilt of the tool, the forging force is slightly greater on the trailing edge of the forging shoulder 50, as indicated by the longer arrows 60a.

In addition to the internal cavity 40, the pin 26 is provided with one or more flow slots or channels 70. Desirably, there is a plurality of channels 70 symmetrically disposed about the pin 26 to avoid creating an imbalanced pin. Two such channels 70 are illustrated on diametrically opposite sides of the pin 26, although the number and arrangement of the channels may be altered. Each of the channels 70 is angled from the external threads 30 to the internal threads 42 in a direction toward the distal end 32. That is, the channels 70 converge inwardly toward the distal end 32. Desirably, the channels or passageways are oriented toward the distal end 32 at an angle of less than 90 degrees with respect to the rotational axis 28, and preferably the channels are formed an angle of about 30–45°

Furthermore, as seen in FIG. 1, the flow channels 70 desirably do not extend within a radial plane, but instead are angled somewhat in the circumferential direction so that a lead-in slot or groove 72 for each is formed on the external surface of the pin 26. The leading groove 72 extends in the direction of rotation 46 of the pin 26, and helps guide and force plasticized material through the flow channels 70.

The various directions of flow of plasticized material are shown in FIG. 2. As with conventional tools, the external threads 30 force plasticized material down toward the backing surface 58, as indicated by the J-shaped arrows 80. In addition, the internal threads 42 force plasticized material toward the backing surface 58, as indicated by the arrows 82. This material flow 82 is enabled by the flow channels 70 that permit plasticized material to flow radially inward into the internal cavity 40, as indicated by the flow arrows 84. The arrow 86 gives the general direction of flow within the internal cavity 40 and toward the distal end 32.

The combination of the internal cavity 40 and flow channel(s) 70 provides a material pumping action for the pin 26. That is, pressure gradients created by the internal cavity 40 and channels 70 pull plasticized material from around a pin 26 and force it downward toward the backing surface 58 along the centerline. Essentially, a plasticized metal pumping action is created by taking advantage of the forging forces associated with the tool shoulder 50, and by providing a continuous flow path through the pin 26. By virtue of the channels 70 and internal cavity 40, plasticized metal driven by the threads continuously flows through the pin along the weld centerline. This substantially increases the throwing power of the tool, and eliminates the minimal deformation of material along the central axis, as with conventional tools.

Increased deformation along the centerline is believed to be highly important in reducing the potential lack of weld root penetration. In addition, only partial recrystallization is observed at the root of the weld with standard pins operating at the outer limits of their throwing power, whereas full recrystallization is attained when using the present pin 26 having internal flow cavities under the same operating parameters. This is indicative of increased localized deformation.

It should be noted that the present invention is primarily intended to increase the performance of present friction stir welding pins, and to reduce the margin for error when locating the tool pin with respect to the bottom of the weld surface (i.e., backing surface). Indeed, the throwing power of conventional friction stir welding tools may be sufficient if the material thickness and other related tolerances are maintained relatively tight. However, as with all tooling, there is a trade-off between the amount spent and the accuracy obtained. In a perfect world, all tooling would be highly accurate and the work pieces would be free of thickness variations. The present invention helps reduce the reliance on these tolerances, and thus provides an important advantage for those applications in which the tolerances can be relaxed.

Because the pin 26 of the present invention has internal cavities, it is somewhat weaker than a similarly shaped solid pin of the prior art. Therefore, a higher strength, higher toughness material such as Nimonic 118 may be required for certain applications.

While the foregoing is a complete description of the preferred embodiments of the invention, various alternatives, modifications, and equivalents may be used. Moreover, it will be obvious that certain other modifications may be practiced within the scope of the appended claims.

What is claimed is:

1. A friction stir welding pin having improved throwing power, comprising:

a pin body rotatable about an axis and having a distal end and an internal flow cavity open to the distal end.

2. The pin of claim 1, further including external threads oriented so as to force plasticized material created during use of the pin toward the distal end.

3. The pin of claim 1, further including internal threads on the pin partly defining the flow cavity.

4. The pin of claim 3, wherein the internal threads are oriented so as to force plasticized material created during use of the pin toward the distal end.

5. The pin of claim 1, further including a flow channel extending from an external surface of the pin body to the internal flow cavity.

6. The pin of claim 5, where the flow channel is angled toward the distal end from the external surface to the internal flow cavity.

7. The pin of claim 5, wherein a plurality of the flow channels are provided.

8. The pin of claim 7, where there are two flow channels diametrically opposed across the pin.

9. The pin of claim 5, further including internal threads on the pin partly defining the flow cavity.

10. The pin of claim 9, wherein the internal threads are oriented so as to force plasticized material created during use of the pin toward the distal end.

11. A method of friction stir welding that increases weld root penetration, comprising:

providing a friction stir welding pin rotatable about an axis and having a distal end and an internal flow cavity open to the distal end;

rotating the pin at the interface between two work pieces at a speed to plasticize the material of the work pieces; and causing plasticized workpiece material to flow through the internal flow cavity toward the distal end.

12. The method of claim 11, wherein the pin further includes a flow channel extending from an external surface thereof to the internal cavity, and the method further includes causing plasticized material to flow through the flow channel to the internal flow cavity.

13. The method of claim 12, wherein the pin includes a pair of diametrically opposed flow channels.

14. The method of claim 13, wherein the flow channels are angled toward the distal end of the pin.

15. The method of claim 12, wherein the pin further includes internal threads partly defining the internal flow cavity, the internal threads being oriented so as to force plasticized material flowing through the flow channel toward the distal end of the pin.

16. The method of claim 11, wherein the pin further includes internal threads partly defining the internal flow cavity, the internal threads being oriented so as to force plasticized material toward the distal end of the pin.

17. A method of friction stir welding, comprising:

providing a friction stir welding pin having an internal flow cavity; and operating the friction stir welding pin such that material plasticized by the pin flows through the internal flow cavity.

18. The method of claim 17, wherein the internal flow cavity is located along the centerline of the pin and open to a distal end thereof, and wherein the plasticized material flows axially through the internal flow cavity toward the root of the weld.

19. The method of claim 18, wherein the internal flow cavity is partly defined by internal threads adapted to force plasticized material toward the distal end of the pin.

20. The method of claim 17, wherein the internal flow cavity comprises a dead-end cavity open to a distal end of the pin, and wherein the pin further includes at least one flow channel extending from a sidewall of the pin to the internal cavity, the method further including inducing a continuous flow of plasticized material from the outside of the pin through the flow channel in the sidewall and through the internal cavity to be expelled out of the distal end.

* * * * *